United States Patent [19]

Kraus

[11] Patent Number: 5,138,894
[45] Date of Patent: Aug. 18, 1992

[54] AXIAL LOADING CAM ARRANGEMENT IN OR FOR A TRACTION ROLLER TRANSMISSION

[75] Inventor: Charles E. Kraus, Austin, Tex.

[73] Assignee: Excelermatic Inc., Austin, Tex.

[21] Appl. No.: 817,057

[22] Filed: Jan. 6, 1992

[51] Int. Cl.⁵ .............................................. F16H 15/08
[52] U.S. Cl. ..................................... 74/200; 475/192; 475/194
[58] Field of Search ............ 74/200, 568 R, 569, 74/571 R; 475/195, 192

[56] References Cited

U.S. PATENT DOCUMENTS

| | | | |
|---|---|---|---|
| 2,292,066 | 8/1942 | Erban | 74/200 |
| 3,087,348 | 4/1963 | Kraus | 74/200 |
| 3,184,983 | 5/1965 | Kraus | 74/200 |
| 3,486,391 | 12/1969 | Kraus | 74/200 |
| 3,788,713 | 1/1974 | Kraus | 384/125 |
| 4,086,820 | 5/1978 | Kraus et al. | 74/200 |
| 4,463,620 | 8/1984 | Horton | 74/200 |
| 5,027,668 | 7/1991 | Nakano | 74/200 |

*Primary Examiner*—Dirk Wright

[57] ABSTRACT

In an axial loading cam arrangement wherein two axial thrust members are supported opposite one another so as to be rotatable relative to one another at least one of the thrust members has a plurality of concentric annular races with annular cam structures formed thereon opposite the other thrust member and in radial symmetry and a plurality of rollers are disposed between the thrust members on said races for generating axial forces on said thrust members upon relative rotational movement thereof. The arrangement is particularly intended for use in a toroidal traction roller transmission wherein the traction rollers are forced into firm engagement with the traction discs between which they are disposed when a torque is transmitted through the transmission.

6 Claims, 3 Drawing Sheets

AXIAL LOADING CAM ARRANGEMENT IN OR FOR A TRACTION ROLLER TRANSMISSION

BACKGROUND OF THE INVENTION

The present invention relates to an axial loading cam arrangement for traction roller transmissions and to traction roller transmissions including such axial loading cams.

In traction roller transmissions the power transmitting traction members have to be held in engagement with one another with substantial forces which depend on the amount of torque to be transmitted. These transmissions therefore usually include loading cam structures which are subjected to the input or output torque applied to, or generated by, the transmission and which provide an axial engagement force for engagement of the traction members which corresponds to such torque.

A loading cam arrangement with load balls arranged between the camming surfaces is shown, for example, in U.S. Pat. No. 3,087,348 which relates to a toroidal transmission;

A loading cam arrangement with conical load rollers arranged between the camming surfaces is shown in U.S. Pat. No. 3,184,983 and a loading cam arrangement with cylindrical load rollers arranged between the camming surfaces is shown in U.S. Pat. No. 4,086,820. As pointed out earlier however the loading cam forces are extremely high and therefore require special and rugged cam structures capable of transmitting the high axial cam forces to the traction members for appropriate engagement. Because of deflections generated by the high cam forces it has not been possible to directly apply the high camming forces to the components which need to be engaged unless the particular components consisted of very thick-walled structures capable of transmitting the large forces without any bending. Such arrangements whether heavy-walled or double-walled to avoid transmission of flexing, however, are heavy and quite expensive.

It is therefore the principal object of the present invention to provide an axial loading cam structure and a transmission with such a loading cam structure which is relatively inexpensive and provides for better load distribution so that smaller components of lesser weight and with lower space requirements can be utilized for the transmission.

SUMMARY OF THE INVENTION

This is achieved with an axial loading cam arrangement with two axial thrust members supported opposite one another so as to be rotatable relative to one another wherein at least one of the thrust members has a plurality of concentric annular races with annular cam structures formed thereon opposite the other thrust member and arranged in radial symmetry and a plurality of rollers are disposed between the thrust members on the races for generating in cooperation with the cam structures axial displacement of the two thrust members upon relative rotational movement thereof.

When used in connection with a toroidal traction roller transmission the axial displacement force which is proportional to a torque transmitted through the transmission is relatively evenly transmitted to the toroidal traction discs of the transmission since a plurality of races with cam structures are utilized which races are arranged concentrically and distributed over the radial extent of the thrust members. Also the cam structures on alternate ones of the races may be angularly displaced so as to be arranged about in the middle between those of adjacent races for even better load distribution.

With this arrangement the cam forces are distributed over a wider area so that the area's specific load is reduced and deleterious bending does not occur even if the components exposed to the cam forces are of reduced thickness.

DESCRIPTION OF THE PREFERRED EMBODIMENTS

First a traction roller transmission is described wherein the camming structure according to the invention is utilized.

Figure 1:
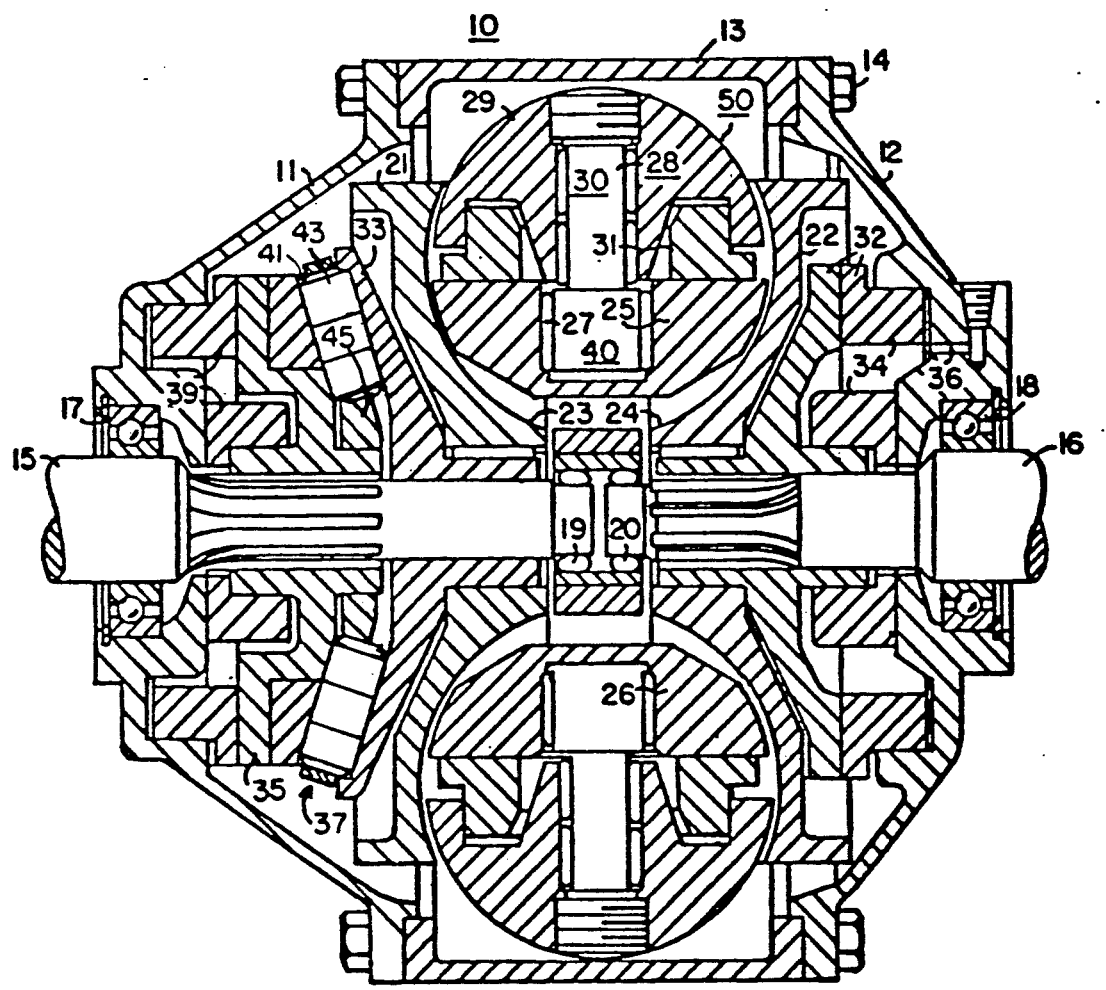
FIG. 1 is a cross-sectional view of a traction roller transmission including the cam structure according to the invention.

As shown in FIG. 1, a traction roller transmission comprises a housing 10 consisting of a central part 13, a front part 11 disposed at one end of the central part 13 and a rear part 12 disposed at the opposite end of the central part 13. The housing parts 11, 12 and 13 are held together as by tension bolts 14. Coaxial input and output shafts 15 and 16 extend through the front and the rear parts 11 and 12 of the housing 10 and are rotatably supported by input and output shaft bearings 17 and 18 and by central support bearings 19 and 20, or alternatively, one shaft may extend into a central bore in the other shaft to be supported therein.

The input shaft 15 carries an input traction disc 21 and the output shaft 16 carries an output traction disc 22 disposed opposite the input traction disc. The traction discs 21 and 22 have opposite toroidal surfaces 23 and 24 and are adapted to engage therebetween power rollers 25 and 26 for the transmission of motion from the input traction disc to the output traction disc. The power rollers 25 and 26 are supported by bearings 27 on a shaft 28 journalled in a roller support structure 29. The shaft 28 has eccentric bearing portions 30 and 40 to permit slight movement of the rollers in a direction normal to the shaft when necessary for firm engagement with the input and output traction discs. Axial support is provided for the power rollers 25 and 26 by axial thrust bearings and seal assemblies 31 preferably of the type as described in applicant's earlier U.S. Pat. No. 3,788,713 issued Jan. 29, 1974 or in U.S. Pat. No. 3,486,391.

The output traction disc 22 is mounted on an axial output thrust member 32 supported on the output shaft 16 for rotation therewith. A hydrostatic axial thrust bearing and seal structure 34 is disposed between the axial thrust member 32 and the housing part 12 to provide axial support for the thrust member 32 and the output traction disc 22.

The input traction disc 21 is mounted on an axial input thrust member 35 and is freely rotatable on the input shaft 15. The input thrust member 35 forms a load cam structure 37 for forcing the input traction disc 21 toward the output traction disc 22 and both discs into engagement with the power rollers when a torque is transmitted through the transmission. The input thrust member 35 has cam faces 41 with cam rollers 43 disposed between the disc 21 and the cam faces 41 to be wedged therebetween when a torque is applied to the input shaft. The rollers 43 are held in position by a cage 45. The thrust member 35 is mounted on the input shaft 15 for rotation therewith and axially supported by a hydrostatic axial thrust bearing 39 disposed between the thrust member 35 and the housing part 11. The hydrostatic axial thrust bearings 39 and 34 are preferably of the type described in the present inventor's earlier U.S. Pat. No. 3,788,713. Hydraulic fluid is supplied to the bearings through passages 36 as shown in FIG. 1 only for bearing 34.

The transmission and operation of such a transmission is described in greater detail in applicant's U.S. Pat. No. 4,086,820. The present invention is mainly concerned with the cam structure 37 for such a transmission which as shown in FIG. 1 includes for each cam three cam rollers disposed axially adjacent one another. This cam structure is shown in detail in FIGS. 2 and 3.

Figure 2:
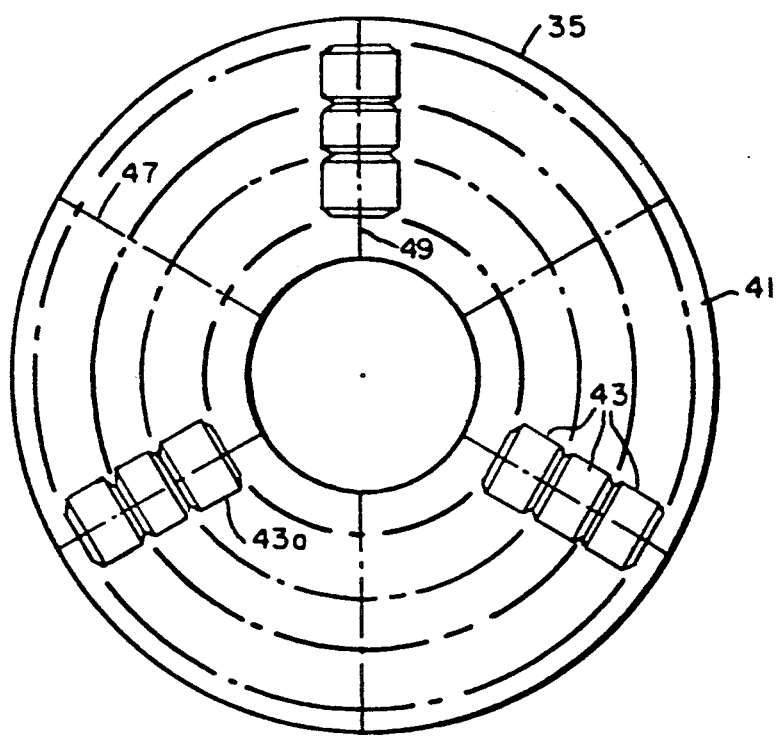
FIG. 2 is a plan view of a cam structure with three camming rollers aligned at each camming low.
Figure 3:
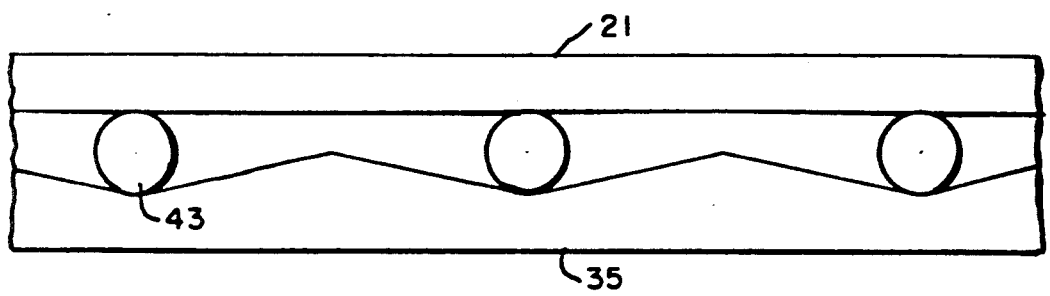
FIG. 3 is a straightened radial inward view into a camming structure as shown in FIG. 2.

In the arrangement of FIGS. 2 and 3 there are provided three sets of cam rollers 43 disposed on the cam face 41 of the thrust member 35, the highs and lows of the cam face 41 being indicated by broken lines 47 and 49, respectively. The cam rollers are shown to be cylindrical because applicant has experienced better results with cylindrical rollers although they are subjected to some spin during relative movement of the thrust member 35 and an opposite thrust member such as the input traction disc 21. They are also shown with the same diameter although rollers with different diameters may be used if the roller races on the traction disc 21 and/or the thrust member 35 are machined appropriately for the selected roller size. It is pointed out that the races for the radially inner rollers 43a have substantially greater slopes than those for the radially outer rollers as the respective cam heights are equal but the race lengths are much shorter for the radially inner rollers.

Figure 4:
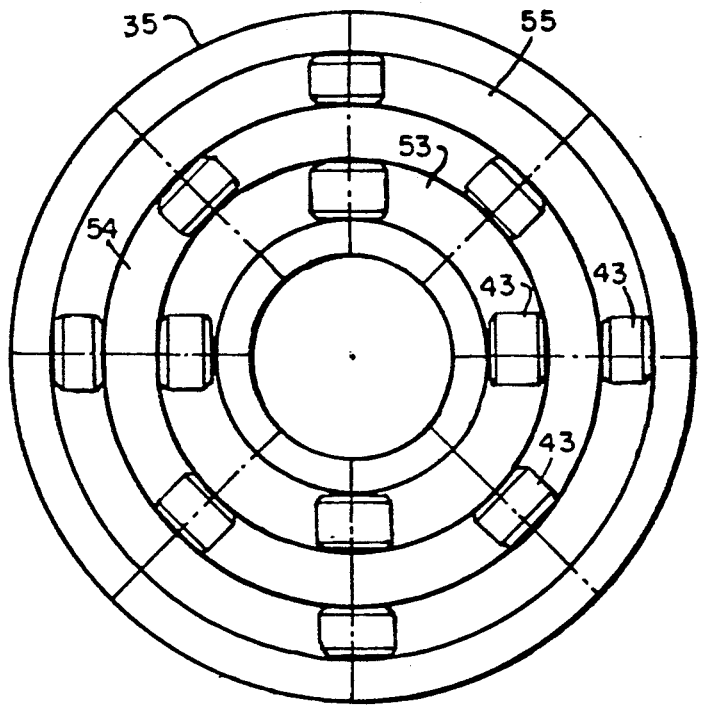
FIG. 4 is a plan view of a cam structure with the intermediate camming roller and race angularly displaced for better force distribution.
Figure 5:
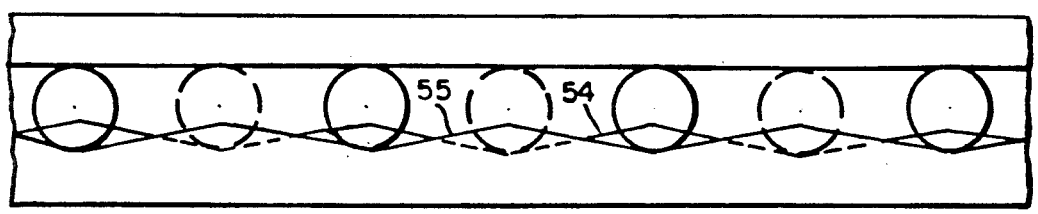
FIG. 5 is a straightened radial inward view into the camming structure shown in FIG. 4.

Although three rollers are shown for each cam there may be more rollers. Instead of rollers there may also be balls or cones arranged in concentric races. Also the cam heights and lows may be displaced for adjacent concentric races as it is shown for the arrangement of FIGS. 4 and 5 where the cam disc includes four heights and lows and the cam heights and lows of the intermediate race are aligned with the cam lows and heights of the adjacent inner and outer cam races 53 and 55 as shown in FIG. 5. Such an arrangement is somewhat more expensive to manufacture but it provides for much improved axial force distribution. Again more than three roller races may be used if this is considered necessary for even greater force distribution.

What is claimed is:

1. An axial loading cam arrangement comprising two axial thrust members supported opposite one another so as to be rotatable relative to one another, at least one of said thrust members having a plurality of concentric annular races formed thereon with an annular cam structure disposed on each of said races opposite the other thrust member and arranged in radial symmetry with the cam structures of adjacent concentric races being angularly displaced and a plurality of antifriction rolling members disposed between said thrust members on said races so as to cause relative axial movement of said two thrust members upon relative rotational movement of said thrust members.

2. An axial loading cam arrangement according to claim 1, wherein said antifriction rolling members are cylindrical rollers.

3. An axial loading cam arrangement according to claim 1, wherein the cam structures of alternate concentric races are arranged in radial symmetry and the cam structures of one set of alternate concentric races are arranged angularly in the middle between the cam structures of the other set of alternate concentric races.

4. A traction roller transmission comprising coaxial input and output shafts carrying toric elements disposed opposite one another, at least two motion transmitting traction rollers disposed between said toric elements in radial symmetry with respect to the axis of the input and output shafts and an axial loading cam arrangement disposed adjacent at least one of said toric elements for forcing said toric elements into firm engagement with said motion transmitting traction rollers when a torque is transmitted through said transmission, said loading cam arrangement comprising two axial thrust members supported opposite one another so as to be rotatable relative to one another, at least one of said thrust members having a plurality of concentric annular races formed thereon with an annular cam structure disposed on each of said races opposite the other thrust member and arranged in radial symmetry and the cam structures of adjacent concentric races being angularly displaced, all being arranged in radial symmetry, a plurality of antifriction rolling members disposed between said thrust members on said races so as to cause relative axial movement of said two thrust members upon relative rotational movement of said thrust members.

5. A traction roller transmission according to claim 4, wherein said antifriction rolling members are cylindrical rollers.

6. A traction roller transmission according to claim 4, wherein the cam structures of alternate concentric races are arranged in radial symmetry and the cam structures of one set of alternate concentric races are arranged angularly in the middle between the cam structures of the other set of alternate concentric races.

* * * * *